(12) United States Patent
Tada et al.

(10) Patent No.: US 11,270,820 B2
(45) Date of Patent: Mar. 8, 2022

(54) COMPOSITION FOR BONDED MAGNETS AND METHOD OF MANUFACTURING THE SAME

(71) Applicant: NICHIA CORPORATION, Anan (JP)

(72) Inventors: Shuichi Tada, Anan (JP); Satoshi Yamanaka, Anan (JP)

(73) Assignee: NICHIA CORPORATION, Anan (JP)

(*) Notice: Subject to any disclaimer, the term of this patent is extended or adjusted under 35 U.S.C. 154(b) by 894 days.

(21) Appl. No.: 16/040,342

(22) Filed: Jul. 19, 2018

(65) Prior Publication Data

US 2019/0027286 A1 Jan. 24, 2019

(30) Foreign Application Priority Data

Jul. 20, 2017 (JP) .............................. JP2017-140843
Jul. 4, 2018 (JP) .............................. JP2018-127536

(51) Int. Cl.
*H01F 1/153* (2006.01)
*H01F 1/059* (2006.01)
(Continued)

(52) U.S. Cl.
CPC ........... *H01F 1/15375* (2013.01); *C08K 5/09* (2013.01); *C08L 23/12* (2013.01); *C08L 51/06* (2013.01);
(Continued)

(58) Field of Classification Search
CPC ...... H01F 1/053; H01F 1/059; H01F 1/15375; C08L 23/12; C08L 51/06; C08L 71/10; C08K 3/10; C08K 5/09; C08K 2201/01
See application file for complete search history.

(56) References Cited

U.S. PATENT DOCUMENTS 5,908,578 A 6/1999 Nishimuro et al.
6,132,634 A 10/2000 Nishimuro et al.
(Continued)

FOREIGN PATENT DOCUMENTS

JP 09223624 A * 8/1997
JP H09223624 A 8/1997
(Continued)

OTHER PUBLICATIONS

Machine translation of JP-09223624-A, 8 pages. (Year: 1997).*
Machine translation of JP-2001068316-A, 13 pages. (Year: 2001).*
Machine translation of JP-2007149911-A, 10 pages. (Year: 2007).*

*Primary Examiner* — Matthew E. Hoban
*Assistant Examiner* — Lynne Edmondson
(74) *Attorney, Agent, or Firm* — Hunton Andrews Kurth LLP

(57) ABSTRACT

The present invention relates to a composition for bonded magnets having good hot water resistance and a method of manufacturing the composition. The method of manufacturing a composition for bonded magnets includes: obtaining a first kneaded mixture by kneading a rare earth-iron-nitrogen-based magnetic powder and an acid-modified polypropylene resin; and obtaining a second kneaded mixture by kneading the first kneaded mixture with a polypropylene resin and an amorphous resin having a glass transition temperature of 120° C. or higher and 250° C. or lower, wherein, with respect to 100 parts by weight of the rare earth-iron-nitrogen-based magnetic powder, the amount of the acid-modified polypropylene resin is 3.5 parts by weight or greater and less than 10.4 parts by weight, and the total amount of the polypropylene resin and the amorphous resin is 0.35 part by weight or greater and less than 3.88 parts by weight.

20 Claims, 3 Drawing Sheets

(51) Int. Cl.
    *H01F 1/053*     (2006.01)
    *C08L 71/10*     (2006.01)
    *C08L 23/12*     (2006.01)
    *C08K 5/09*     (2006.01)
    *C08L 51/06*     (2006.01)

(52) U.S. Cl.
    CPC .............. *C08L 71/10* (2013.01); *H01F 1/053* (2013.01); *H01F 1/059* (2013.01); *C08K 2201/01* (2013.01)

(56) References Cited

U.S. PATENT DOCUMENTS

2002/0084439 A1*   7/2002   Hart ........................ H01F 1/059
                                                                                                              252/62.54
2014/0294657 A1    10/2014   Yamamoto et al.

FOREIGN PATENT DOCUMENTS

| JP | 2001068316 A | * | 3/2001 | ........... H01F 1/0558 |
|----|--------------|---|--------|------------------------|
| JP | 2001068316 A |   | 3/2001 |                        |
| JP | 2007149911 A | * | 6/2007 |                        |
| JP | 2007149911 A |   | 6/2007 |                        |
| JP | 2008130630 A |   | 6/2008 |                        |
| JP | 2013069926 A |   | 4/2013 |                        |

\* cited by examiner

COMPOSITION FOR BONDED MAGNETS AND METHOD OF MANUFACTURING THE SAME

CROSS-REFERENCE TO RELATED PATENT APPLICATION

This application claims priority to Japanese Patent Application No. 2017-140843 filed on July 20, 2017 and Japanese Patent Application No. 2018-127536 filed on Jul. 4, 2018. The disclosures of Japanese Patent Application No. 2017-140843 and Japanese Patent Application No. 2018-127536 are hereby incorporated by reference in their entireties.

BACKGROUND

Technical Field

The present invention relates to a composition for bonded magnets and a method of manufacturing the composition.

Description of Related Art

High-performance small motors and actuators for use in engine rooms in automobiles are required to provide many high-level functions, such as very high magnetic force, heat resistance, and corrosion resistance. Thus, rare earth sintered magnets have been mainly used for such motors and actuators. However, along with the recent demand for reduction in weight and cost, rare earth sintered magnets have been increasingly replaced by rare earth bonded magnets which are less expensive materials than rare earth sintered magnets and which have high flexibility in shape, high dimensional stability, and low production cost. In particular, rare earth bonded magnets in which rare earth-iron-nitrogen-based magnetic powders (nitride powders), among other rare earth magnetic powders, are dispersed in resins characteristically have good corrosion resistance. Thus, they can be expected to be applicable to small motors and actuators for use under severe conditions, such as immersion in hot water or exposure to high-temperature, high-humidity environments.

Mainly, 12 nylon resins (hereinafter, PA12 resins) or polyphenylene sulfide resins (hereinafter, PPS resins) are used as resin binders of rare earth-iron-nitrogen-based bonded magnets. PA12 resins are most commonly used binders because they have various features such as good mechanical strength, fluidity, magnetic powder filling properties, and recycling properties. However, since PA12 resins have a relatively high water absorption rate due to the presence of amide groups in the structure, they can undergo dimensional changes due to water absorption and a reduction in strength due to hydrolysis when they are exposed to severe environments such as immersion in hot water. Although PPS resins are poor in mechanical strength and magnetic powder filling properties as compared to PA12 resins, they have very good heat resistance and water resistance and thus are used as binders for bonded magnets for use in severe environments. However, these PPS resins have a high melting point (about 280° C.), and thus the temperature needs to be high (over 300° C.) for kneading these resins with magnetic powders. Rare earth-iron-nitrogen-based magnetic powders, which have high surface activity, can be oxidatively degraded when kneaded with PPS resins at high temperatures, resulting in a reduction in long-term magnetic force stability (demagnetization resistance).

Polypropylene resins may be used as alternative resins to PA12 and PPS resins. Polypropylene resins have water resistance but have a low polarity and thus are poor in adhesion to magnetic powders and therefore in magnetic powder filling properties and mechanical strength. In addition, these polypropylene resins have a low glass transition temperature (Tg=about 0° C.), and the molecules can be excited as the temperature increases, which unfortunately results in lower water resistance. These resins are difficult to use under severe conditions, such as immersion in hot water (e.g. at 100° C. or higher) or exposure to high-temperature, high-humidity environments.

In regard to these problems, JP 2007-149911 A discloses, instead of bonded magnets using rare earth-iron-nitrogen-based magnetic powders, a permanent magnet in which the surface of a permanent magnet body is covered with a packing sheet including a stack of a heat-adhesive resin layer formed from an acid-modified polyolefin or the like and a heat-resistant resin layer formed from a biaxially stretched polyethylene naphthalate or the like.

SUMMARY

According to embodiments, the present invention aims to provide a composition for bonded magnets for producing a bonded magnet having good hot water resistance, and a method of manufacturing the composition.

Specific means to solve the problems are as described below and the present invention encompasses the following embodiments.

According to a first embodiment of the present invention, a method of manufacturing a composition for bonded magnets includes: obtaining a first kneaded mixture by kneading a rare earth-iron-nitrogen-based magnetic powder and an acid-modified polypropylene resin; and obtaining a second kneaded mixture by kneading the first kneaded mixture with a polypropylene resin and an amorphous resin having a glass transition temperature of 120° C. or higher and 250° C. or lower, wherein, with respect to 100 parts by weight of the rare earth-iron-nitrogen-based magnetic powder, an amount of the acid-modified polypropylene resin is 3.5 parts by weight or greater and less than 10.4 parts by weight, and a total amount of the polypropylene resin and the amorphous resin is 0.35 part by weight or greater and less than 3.88 parts by weight.

According to a second embodiment of the present invention, a method of manufacturing a composition for bonded magnets includes: providing a rare earth-iron-nitrogen-based magnetic powder having a coat layer containing a basic group, an acid-modified polypropylene resin, a polypropylene resin, and an amorphous resin having a glass transition temperature of 120° C. or higher and 250° C. or lower; and obtaining a kneaded mixture by kneading the rare earth-iron-nitrogen-based magnetic powder having a coat layer containing a basic group, the acid-modified polypropylene resin, the polypropylene resin, and the amorphous resin having a glass transition temperature of 120° C. or higher and 250° C. or lower, wherein, with respect to 100 parts by weight of the rare earth-iron-nitrogen-based magnetic powder, an amount of the acid-modified polypropylene resin is 3.5 parts by weight or greater and less than 10.4 parts by weight, and a total amount of the polypropylene resin and the amorphous resin is 0.35 part by weight or greater and less than 3.88 parts by weight.

According to a third embodiment of the present invention, a composition for bonded magnets contains: a rare earth-iron-nitrogen-based magnetic powder; an acid-modified polypropylene resin; a polypropylene resin; and an amorphous resin having a glass transition temperature of 120° C. or higher and 250° C. or lower, wherein, with respect to 100 parts by weight of the rare earth-iron-nitrogen-based magnetic powder, an amount of the acid-modified polypropylene resin is 3.5 parts by weight or greater and less than 10.4 parts by weight, and a total amount of the polypropylene resin and the amorphous resin is 0.35 part by weight or greater and less than 3.88 parts by weight.

According to the above embodiments, it is possible to provide a composition for bonded magnets for producing a bonded magnet having good hot water resistance, and methods of manufacturing the composition.

DETAILED DESCRIPTION

Figure 1:
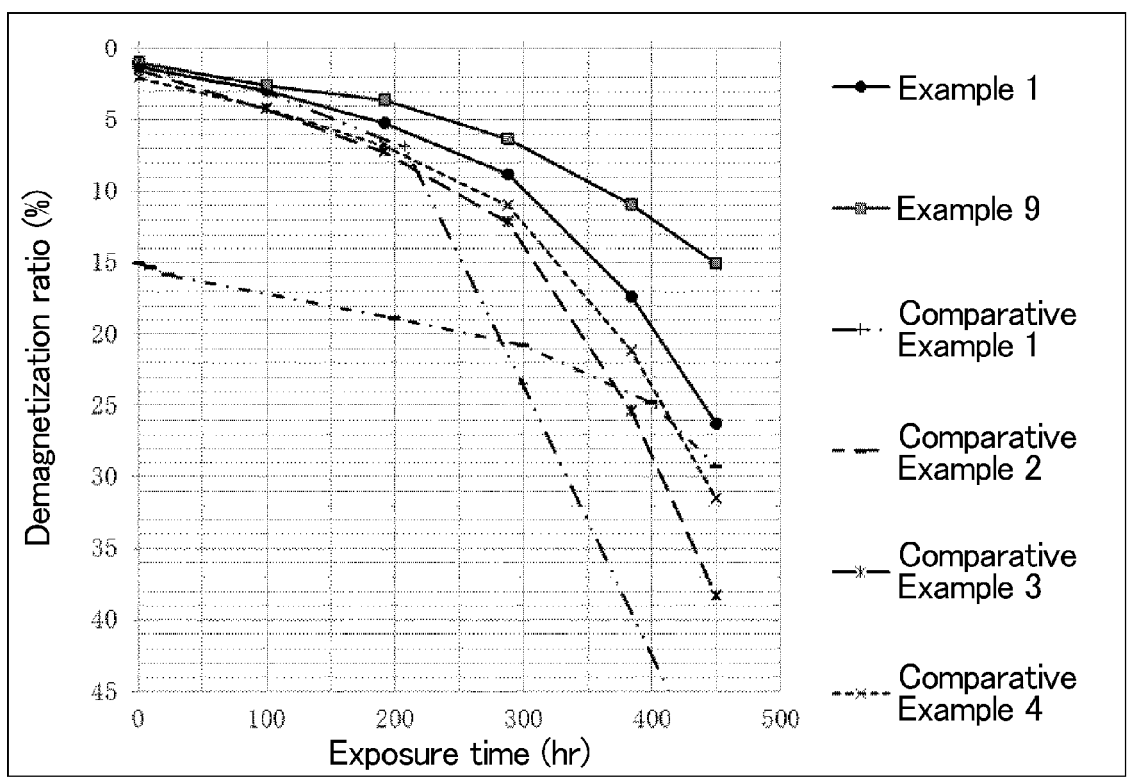
FIG. 1 shows the relationships between the exposure time and the demagnetization ratio in a pressure cooker test (121° C./2 atm) according to Examples 1 and 9 and Comparative Examples 1-4 of the present disclosure.

Hereinafter, certain embodiments of the present invention will be described. The embodiments described below are intended to give a concrete form to the technical idea of the present invention and are not intended to limit the scope of the present invention to the embodiments described below. When multiple substances correspond to a component included in a composition, "the amount of the component in the composition" as used in the present specification refers to the total amount of the multiple substances in the composition, unless otherwise stated.

Method of Manufacturing Composition for Bonded Magnets According to First Embodiment The manufacturing method according to this embodiment includes: obtaining a first kneaded mixture by kneading a rare earth-iron-nitrogen-based magnetic powder and an acid-modified polypropylene resin; and obtaining a second kneaded mixture by kneading the first kneaded mixture with a polypropylene resin and an amorphous resin having a glass transition temperature of 120° C. or higher and 250° C. or lower. With respect to 100 parts by weight of the rare earth-iron-nitrogen-based magnetic powder, the amount of the acid-modified polypropylene resin is 3.5 parts by weight or greater and less than 10.4 parts by weight, and the total amount of the polypropylene resin and the amorphous resin is 0.35 part by weight or greater and less than 3.88 parts by weight.

Polypropylene resins have water resistance, but these resins are poor in adhesion to metals due to their low polarity and also have insufficient heat resistance. Amorphous resins are suitable for compositions for bonded magnets because the degree of mold shrinkage of these resins is smaller than that of crystalline resins; however, since these amorphous resins have high viscosity, the kneading temperature during the manufacture of a composition for bonded magnets needs to be set higher than the glass transition temperature at which the resins start to melt. This may cause oxidative degradation of the rare earth-iron-nitrogen-based magnetic powder used, depending on the type of resin. Thus, this embodiment includes obtaining a first kneaded mixture by kneading a rare earth-iron-nitrogen-based magnetic powder and an acid-modified polypropylene resin, in order to provide increased water resistance due to the nature of polypropylene resins and increased adhesion to the magnetic powder due to the presence of the acid-modified portion of the resin. Subsequently, this embodiment includes obtaining a second kneaded mixture by kneading the first kneaded mixture with a polypropylene resin and an amorphous resin having a glass transition temperature of 120° C. or higher and 250° C. or lower at a predetermined ratio with respect to the magnetic powder, in order to provide the bonded magnet with hot water resistance attributable to the polypropylene resin and the amorphous resin. Moreover, kneading the polypropylene resin and the amorphous resin together reduces the viscosity, which allows the kneading temperature during the manufacture of a composition for bonded magnets to be set close to the glass transition temperature of the amorphous resin. Specifically, it is considered that, when the amorphous resin has a glass transition temperature of 120° C. or higher, the amorphous resin maintains thermal stability even in an environment at 120° C., and therefore the bonded magnet provides hot water resistance in addition to water resistance attributable to polypropylene. It is also considered that, when the amorphous resin has a glass transition temperature of 250° C. or lower, the kneading temperature during the manufacture of a composition for bonded magnets is allowed to be set to 250° C. or lower where the magnetic powder is less likely to undergo oxidative degradation, and therefore the bonded magnet has improved hot water resistance.

The steps are described in detail below.

Obtaining First Kneaded Mixture

The first kneaded mixture may be obtained by kneading a rare earth-iron-nitrogen-based magnetic powder and an acid-modified polypropylene resin while heating at 210° C. to 250° C. Any kneading machine may be used, and examples include single-screw extruders, special single-screw extruders, kneaders, mixing rollers, Banbury mixers, intermeshing type twin-screw extruders, and non-intermeshing type twin-screw extruders.

Rare Earth-Iron-Nitrogen-Based Magnetic Powder

Examples of the rare earth-iron-nitrogen-based magnetic powder include SmFeN-based magnetic powders having good remanence and good inherent coercive force. The SmFeN-based magnetic powder may be a nitride containing a rare earth metal (Sm), iron (Fe), and nitrogen (N) as represented by general formula: $Sm_xFe_{(100-x-y)}N_y$, where the value "x" indicating the atomic percent (%) of the rare earth metal Sm is in a range of 3 to 30 (at %); the value "y" indicating the atomic percent (%) of N is in a range of 5 to 15 (at %); and the balance is mainly Fe. The reason for limiting the atomic percent of Sm to 3 to 30 (at %) is as follows: at less than 3 at %, separation of the α-Fe phase may occur, thereby reducing the coercive force of the nitride so that the magnet can become unpractical; and at greater than 30 at %, precipitation of Sm may occur, rendering the alloy powder unstable in the air and thus reducing remanent magnetization. Meanwhile, the reason for limiting the atomic percent of nitrogen N to 5 to 15 (at %) is as follows: at less than 5 at %, coercive force may is hardly exerted; and at greater than 15 at %, nitrides of Sm, iron, or alkaline metals themselves may be formed.

The SmFeN-based magnetic powder may be manufactured, for example, by a method disclosed in Japanese Patent No. 3698538. The SmFeN-based magnetic powder may have an average particle size of 2 µm to 5 µm and a standard deviation of the particle size distribution of 1.5 or less.

The magnetic powder to be used in this embodiment is preferably surface-treated in order to improve oxidation resistance, water resistance, resin wettability, or chemical resistance as described below. Such treatments may be used in combination, if necessary. The surface treatment may be performed by a process chosen according to the needs, but basically by a wet process or a dry process (e.g. using a mixer).

Examples of such treatment agents include, firstly, phosphorus compounds having a P—O bond. Examples of phosphoric acid treatment agents include inorganic or organic phosphoric acid treatment agents such as orthophosphoric acid, sodium dihydrogen phosphate, ammonium dihydrogen phosphate, diammonium hydrogen phosphate, zinc phosphate, calcium phosphate, and other phosphates; hypophosphorous acid and hypophosphites; pyrophosphoric acid, and polyphosphoric acids. Basically, such a phosphoric acid source may be dissolved in water or an organic solvent such as IPA and optionally supplemented with a reaction accelerator such as nitric acid ions and/or a crystal grain refining agent such as V ions, Cr ions, or Mo ions, and then a magnetic powder may be introduced into the resulting phosphoric acid bath to form a passivation film having a P-O bond on the surface of the powder particles.

Besides these phosphate film treatments, the following methods may be used: treatments in which submicron or nano-order particles are adsorbed to the magnetic powder surface by a wet or dry process to form an inorganic oxide film such as silica, alumina, or titania film; sol-gel methods using organic metals; or treatments in which an inorganic oxide-treated film is formed on the magnetic powder surface.

Next, a coating treatment of a magnetic powder with a coupling agent is described. Before kneading the resin and the magnetic powder to form a composite, a coat layer may be formed on the outermost surface of the surface-treated-film of the magnetic powder using a coupling agent in order to provide compatibility and association with the resin. It is preferable to form a coat layer using a coupling agent having a basic group in order to provide association with the acid-modified portion of the acid-modified polypropylene resin. Examples of the basic group include epoxy and amino groups. It is preferable in view of association to use a coupling agent having an amino group. Examples of silane coupling agents having an amino group include γ-(2-aminoethyl)aminopropyltrimethoxysilane, γ-(2-aminoethyl)aminopropyltriethoxysilane, γ-aminopropyltrimethoxysilane, γ-aminopropylmethyldimethoxysilane, γ-aminopropyltriethoxysilane, γ-aminopropylmethyldiethoxysilane, N-phenyl-γ-aminopropyltrimethoxysilane, γ-(2-aminoethyl)aminopropylmethyldimethoxysilane, N-β-(N-vinylbenzylaminoethyl)-γ-aminopropyltrimethoxysilane hydrochloride, N-β(aminoethyl)-γ-}aminopropyltrimethoxysilane, N-β(aminoethyl)-γ-aminopropylmethyldimethoxysilane, bis(trimethoxysilylpropyl)amine, and N-(1,3-dimethylbutylidene)-3-(triethoxysilyl)-1-propanamine. In the present invention, it is preferable to use a coupling agent having good reactivity with the acid anhydride group attached to the resin, preferably, for example, γ-(2-aminoethyl)aminopropyltrimethoxysilane, γ-(2-aminoethyl)aminopropyltriethoxysilane, γ-aminopropyltrimethoxysilane, or γ-aminopropyltriethoxysilane.

Moreover, in order to obtain a molded magnet having good properties, the amount (by weight) of amino groups derived from the coupling agent per unit surface area of the magnetic powder is more preferably 0.5 to 5 mg/m$^2$. An amount of less than 0.5 mg/m$^2$ may result in insufficient insulation between the particles. An amount of greater than 5 mg/m$^2$ may result in both lower magnetic properties and lower water resistance due to agglomeration of the magnetic particles resulting from excessively increased affinity between these particles.

Acid-Modified Polypropylene Resin

In order to increase the adhesion to the rare earth-iron-nitrogen-based magnetic powder, it is preferable to use an acid-modified polypropylene resin. Examples of the acid include saturated or unsaturated carboxylic acids and carboxylic acid anhydrides. Specific examples include maleic acid, fumaric acid, succinic acid, oxalic acid, maleic anhydride, and succinic anhydride. Among these, maleic anhydride is preferable in view of association with the rare earth magnetic powder. Examples of maleic anhydride-modified polypropylene resins include maleic anhydride-grafted polypropylene resins. The maleic anhydride group may further increase adhesion by chemically bonding to the basic group at the tip of the coupling agent, particularly having an amino group, on the outermost surface of the magnetic powder. The maleic anhydride-modified polypropylene resins are polypropylene resins modified with maleic acid or maleic anhydride. Such modification may be carried out by conventionally known methods. For example, maleic anhydride may be added together with a peroxide to a polypropylene resin and kneaded using a single screw kneading extruder or a twin-screw kneading extruder to cause a graft reaction. The maleic anhydride-modified polypropylene resin to be used in the bonded magnet according to this embodiment may be produced by modifying a commercially available polypropylene resin with an acid anhydride by a method as described above. Alternatively, it may be a commercially available maleic anhydride-modified polypropylene resin.

The degree of acid modification relative to polypropylene is, for example, in a range of 0.1% by weight or greater and 5% by weight or less, preferably of 0.2% by weight or greater and 2.8% by weight or less, more preferably of 0.35% by weight or greater and 1.4% by weight or less, particularly preferably of 0.7% by weight or greater and 1.25% by weight or less, to improve hot water resistance.

The number average molecular weight of the acid-modified polypropylene resin is preferably in a range of 20,000 or greater and 90,000 or less. A number average molecular weight of less than 20,000 reduces the mechanical strength of the bonded magnet. A number average molecular weight of greater than 90,000 increases the viscosity.

The amount of the acid-modified polypropylene resin is, for example, in a range of 3.5 parts by weight or greater and less than 10.4 parts by weight, preferably of 4 parts by weight or greater and less than 9.3 parts by weight, particularly preferably of 5 parts by weight or greater and 7 parts by weight or less, with respect to 100 parts by weight of the rare earth-iron-nitrogen-based magnetic powder. An amount of less than 3.5 parts by weight reduces the adhesion to the rare earth-iron-nitrogen-based magnetic powder. An amount of 10.4 parts by weight or greater reduces hot water resistance.

Obtaining Second Kneaded Mixture

The second kneaded mixture may be obtained by kneading the first kneaded mixture with a polypropylene resin and an amorphous resin having a glass transition temperature of 120° C. or higher and 250° C. or lower while heating at 210° C. to 250° C.

Polypropylene Resin

The polypropylene resin is preferably a non-modified polypropylene resin having a number average molecular weight in a range of 20,000 or greater and 90,000 or less. A number average molecular weight of less than 20,000 reduces the mechanical strength of the bonded magnet. A number average molecular weight of greater than 90,000 increases the viscosity.

The amount of the polypropylene resin is, for example, in a range of 0.05 parts by weight or greater and less than 0.65 parts by weight, preferably 0.2 parts by weight or greater and 0.5 parts by weight or less, with respect to 100 parts by weight of the rare earth-iron-nitrogen-based magnetic powder, to improve hot water resistance.

Amorphous Resin

The amorphous resin to be used is a resin having a glass transition temperature of 120° C. or higher with good miscibility with the polypropylene resin in order to compensate for the low thermal stability of the acid-modified polypropylene resin and the polypropylene resin. The resin to be used also has a glass transition temperature of 250° C. or lower in order to keep the molding temperature low to prevent oxidative degradation of the rare earth-iron-nitrogen-based magnetic powder. Examples of the amorphous resin having a glass transition temperature of 120° C. or higher and 250° C. or lower include polycarbonate resins (PC), polyphenylene ether resins (PPE), polyether sulfone resins (PES), polysulfone resins (PSU), polyether imide resins (PEI), and polyarylate resins (PAR). These resins may be used alone or in combinations of two or more. In particular, polyphenylene ether having a glass transition temperature higher than 200° C. with a very low water absorption rate is preferable. The polyphenylene ether may be modified.

The amount of the amorphous resin is, for example, in a range of 0.1 parts by weight or greater and less than 3.23 parts by weight, preferably of 0.3 parts by weight or greater and 2.5 parts by weight or less, particularly preferably of 0.7 parts by weight or greater and 2 parts by weight or less, with respect to 100 parts by weight of the rare earth-iron-nitrogen-based magnetic powder, to improve hot water resistance.

The total amount of the polypropylene resin and the amorphous resin is, for example, in a range of 0.35 part by weight or greater and less than 3.88 parts by weight, preferably of 0.5 parts by weight or greater and 2.5 parts by weight or less, with respect to 100 parts by weight of the rare earth-iron-nitrogen-based magnetic powder, to improve hot water resistance.

Polymer Alloy

In order to improve miscibility with the acid-modified polypropylene resin, it is preferable to use a polymer alloy containing the polypropylene resin and the amorphous resin having a glass transition temperature of 120° C. or higher and 250° C. or lower.

The polymer alloy resin containing the amorphous resin and the polypropylene resin may be produced by any conventionally known methods. For example, when the amorphous resin is polyphenylene ether, a polymer alloy resin may be produced by the following methods: a polypropylene resin and a polyphenylene ether/polystyrene resin are separately combined with a peroxide and maleic anhydride, followed by melt-kneading using a single screw kneading extruder or a twin-screw kneading extruder to obtain resins graft-modified with the acid anhydride; diamine is added to these resins and kneaded again to bond the constituent components by grafting. Alternatively, a compatibilizer is added to a polypropylene resin and a polyphenylene ether/polystyrene alloy resin and kneaded. Examples of the compatibilizer used in the latter case include hydrogenated butadiene/styrene copolymers, styrene-ethylene/butylene-styrene block copolymers, styrene-ethylene/butylene-ethylene block copolymers, and ethylene-ethylene/butylene-ethylene block copolymers. The amount of the polypropylene resin in the polymer alloy is adjusted in a range of, for example, 10% by mass or greater and 20% by mass or less. The amount of the amorphous resin is adjusted in a range of, for example, 50% by mass or greater and 70% by mass or less. The polymer alloy resin may be a commercial product, and examples include Xyron EV103 and Xyron T0702 (Asahi Kasei Corporation), and Lemalloy PX603Y (Mitsubishi Chemical Corporation).

Examples of the polyphenylene ether resin include poly (2,6-dimethyl-1,4-phenylene)ether, poly(2-methyl-6-ethyl-1,4-phenylene)ether, poly(2,6-diethyl-1,4-phenylene)ether, poly(2-methyl-6-n-propyl-1,4-phenylene)ether, poly(2-ethyl-6-n-propyl-1,4-phenylene)ether, poly(2,6-di-n-propyl-1,4-phenylene)ether, poly(2-methyl-6-propyl-1,4-phenylene)ether, poly(2-ethyl-6-isopropyl-1,4-phenylene)ether, poly(2,6-diisopropyl-1,4-phenylene)ether, poly(2-methyl-6-phenyl-1,4-phenylene)ether, poly(2,6-diphenyl-1,4-phenylene)ether, poly(2-methyl-6-chloro-1,4-phenylene)ether, poly(2-methyl-6-hydroxyethyl-1,4-phenylene)ether, poly(2-methyl-6-chloroethyl-1,4-phenylene)ether, poly(2-methyl-6-methoxy-1,4-phenylene)ether, poly(2-methyl-1,4-phenylene)ether, poly(1,4-phenylene)ether, and poly(2,6-di(p-fluorophenyl)-1,4-phenylene)ether.

The amount of the polymer alloy is, for example, in a range of 0.5 parts by weight or greater and less than 5.38 parts by weight, preferably of 1 part by weight or greater and 5 parts by weight or less, with respect to 100 parts by weight of the rare earth-iron-nitrogen-based magnetic powder, to improve hot water resistance.

Obtaining Third Kneaded Mixture

This embodiment preferably further includes obtaining a third kneaded mixture by kneading the second kneaded mixture and a polypropylene resin having a number average molecular weight of 9,000 or less. The third kneaded mixture may be obtained by kneading the second kneaded mixture and a polypropylene resin having a number average molecular weight of 9,000 or less while heating at 210° C. to 250° C.

Polypropylene Resin Having Number Average Molecular Weight of 9,000 or Less

Use of a low molecular weight polypropylene resin having a number average molecular weight of 9,000 or less further improves hot water resistance. Examples of the low molecular weight polypropylene resin include Hi-Wax (Mitsui Chemicals, Inc.), Umex and Viscol (Sanyo Chemical Industries, Ltd.), and Licocene PP (Clariant).

The amount of the polypropylene resin having a number average molecular weight of 9,000 or less is, for example, in a range of 0.01 part by weight or greater and 3.5 parts by weight or less, preferably of 0.08 parts by weight or greater and 3 parts by weight or less, particularly preferably of 0.7 parts by weight or greater and 2.5 parts by weight or less, with respect to 100 parts by weight of the rare earth-iron-nitrogen-based magnetic powder, to improve hot water resistance.

The polypropylene resin having a number average molecular weight of 9,000 or less is more preferably a non-modified polypropylene resin. Use of a non-modified polypropylene resin having a number average molecular weight of 9,000 or less further improves hot water resistance.

Additives

In the steps of obtaining the respective kneaded mixtures, various additives may be added, if necessary, such as lubricants, antioxidants, heavy metal deactivators, crystal nucleating agents, flame retardants, plasticizers, ultraviolet absorbers, antistatic agents, colorants, and release agents. Among these additives, phenolic or phosphorus antioxidants and/or heavy metal deactivators may be suitably used in order to alleviate damage to the resin molecules due to severe conditions (e.g. high temperature and high humidity), catalysis by ultraviolet light or active metals, or external forces (e.g. shear and friction), to which the product is exposed during the kneading or bonded magnet formation processes or during actual use.

Method of Manufacturing Composition for Bonded Magnets According to Second Embodiment The manufacturing method according to this embodiment is a method of manufacturing a composition for bonded magnets, including: providing a rare earth-iron-nitrogen-based magnetic powder having a coat layer containing a basic group, an acid-modified polypropylene resin, a polypropylene resin, and an amorphous resin having a glass transition temperature of 120° C. or higher and 250° C. or lower; and obtaining a kneaded mixture by kneading the rare earth-iron-nitrogen-based magnetic powder having a coat layer containing a basic group, the acid-modified polypropylene resin, the polypropylene resin, and the amorphous resin having a glass transition temperature of 120° C. or higher and 250° C. or lower, wherein, with respect to 100 parts by weight of the rare earth-iron-nitrogen-based magnetic powder, the amount of the acid-modified polypropylene resin is 3.5 parts by weight or greater and less than 10.4 parts by weight, and the total amount of the polypropylene resin and the amorphous resin is 0.35 part by weight or greater and less than 3.88 parts by weight.

In the second embodiment, the rare earth-iron-nitrogen-based magnetic powder having a coat layer containing a basic group and the acid-modified polypropylene resin are kneaded together in order to provide increased water resistance due to the nature of polypropylene resins and increased adhesion to the magnetic powder due to association between the basic group and the acid-modified portion. It is also considered that the polypropylene resin and the amorphous resin are also kneaded together in order to provide the bonded magnet with hot water resistance attributable to the polypropylene resin and the amorphous resin, as is the case in the first embodiment.

The kneaded mixture in the second embodiment may be obtained by kneading a rare earth-iron-nitrogen-based magnetic powder having a coat layer containing a basic group, an acid-modified polypropylene resin, a polypropylene resin, and an amorphous resin having a glass transition temperature of 120° C. or higher and 250° C. or lower while heating at 210° C. to 250° C. Any kneading machine may be used, and examples include single-screw extruders, special single-screw extruders, kneaders, mixing rollers, Banbury mixers, intermeshing type twin-screw extruders, and non-intermeshing type twin-screw extruders. The rare earth-iron-nitrogen-based magnetic powder and the resins, and the amount and other conditions thereof are as described above in the first embodiment, and detailed descriptions thereof are thus omitted.

The kneaded mixture in the second embodiment preferably further contains a polypropylene resin having a number average molecular weight of 9,000 or less which has been provided in advance. The polypropylene resin having a number average molecular weight of 9,000 or less and the amount and other conditions thereof are as described above in the first embodiment, and detailed descriptions thereof are thus omitted.

The composition for bonded magnets according to the second embodiment may be obtained by cutting the above-described kneaded mixture into an appropriate size after cooling.

Composition for Bonded Magnet According to Third Embodiment

The composition for bonded magnets according to this embodiment includes: a rare earth-iron-nitrogen-based magnetic powder; an acid-modified polypropylene resin; a polypropylene resin; and an amorphous resin having a glass transition temperature of 120° C. or higher and 250° C. or lower, wherein, with respect to 100 parts by weight of the rare earth-iron-nitrogen-based magnetic powder, the amount of the acid-modified polypropylene resin is 3.5 parts by weight or greater and less than 10.4 parts by weight, and the total amount of the polypropylene resin and the amorphous resin is 0.35 part by weight or greater and less than 3.88 parts by weight.

In the third embodiment, the presence of the acid-modified polypropylene resin increases adhesion to the rare earth-iron-nitrogen-based magnetic powder. Further, the presence of the polypropylene resin and the amorphous resin having a glass transition temperature of 120° C. or higher and 250° C. or lower at a predetermined ratio with respect to the magnetic powder provides water resistance attributable to the polypropylene resin and heat resistance attributable to the amorphous resin. Overall, this results in improved hot water resistance.

Also in the third embodiment, within the composition for bonded magnets, the acid-modified polypropylene resin tends to be located on the surface of the magnetic powder particles due to adhesion of the acid-modified group of the acid-modified polypropylene resin to the magnetic powder, while the polypropylene resin and the amorphous resin having a glass transition temperature of 120° C. or higher and 250° C. or lower tend to be located on the surface of the acid-modified polypropylene resin. The acid-modified group portion of the acid-modified polypropylene resin, which has polarity, can bind to moisture, but hot water resistance is provided by the presence of the polypropylene resin and the amorphous resin on the surface of the acid-modified polypropylene resin. The rare earth-iron-nitrogen-based magnetic powder and the resins, and the amount and other conditions thereof are as described above in the first embodiment, and detailed descriptions thereof are thus omitted.

In view of hot water resistance, the composition for bonded magnets preferably further contains a polypropylene resin having a number average molecular weight of 9,000 or less. When the number average molecular weight is 9,000 or less, such a low molecular weight component tends to bleed out to the outermost surface of the composition to form a skin layer, and tends to be located on the surface of the polypropylene resin and the amorphous resin. This increases hot water resistance. The polypropylene resin having a number average molecular weight of 9,000 or less and the amount and other conditions thereof are as described above in the first embodiment, and detailed descriptions thereof are thus omitted.

With the use of the composition for bonded magnets, it is possible to manufacture a bonded magnet having good hot water resistance. Specifically, for example, a bonded magnet may be obtained by heat treating the composition for bonded magnets in an orientation field to align the easy axes of magnetization (orientation step), followed by pulse magnetization in a magnetizing field (magnetization step).

The heat treatment temperature in the orientation step is preferably, for example, 90° C. or higher and 250° C. or lower, more preferably in a range of 150° C. to 230° C. The magnitude of the orientation field in the orientation step may be, for example, 720 kA/m. The magnitude of the magnetizing field in the magnetization step may be, for example, 1500 to 2500 kA/m.

EXAMPLES

Hereinafter, certain examples of the present invention are described in detail. The details of materials, test methods, and evaluation methods are described by means of examples, but the present invention is not limited to these examples, and modifications may be made without departing from the gist of the present invention.
1. Providing Raw Materials
1-1. Rare Earth-Iron-Nitrogen-Based Magnetic Powder
Surface Treatment Method An Sm—Fe—N anisotropic magnetic powder (3,000 g) was introduced into a mixer, followed by purging with nitrogen. Then, a mixed solution of a silane coupling agent (γ-aminopropyltriethoxysilane) (12 g), ethanol (12 g), and ammonia water (6 g) was added by spray to the magnetic powder with mixing, followed by mixing for one minute and then drying under nitrogen flow at 120° C. for five hours. Thus, an $Sm_2Fe_{17}N_3$ powder having a coupling agent film formed on a silica film (hereinafter, magnetic powder (A)) was obtained.

Average particle size: about 2.8 μm (measured by FSSS method)
Magnetic properties:
Remanence (Br): 12.5 kG
Inherent coercive force (iHc): 16 kOe
Squareness (Hk): 7 kOe
1-2. Acid-Modified Polypropylene Resin (Hereinafter, Resin (A))
Polypropylene Resin:
Degree of maleic anhydride modification: 1% by weight
Number average molecular weight (Mn): about 40,000
1-3. Polypropylene Resin (Hereinafter, Resin (B)) and Amorphous Resin (Hereinafter, Resin (C))
Polypropylene resin:
Acid modification: none
Number average molecular weight (Mn): about 20,000
Amorphous resin: poly(2,6-dimethyl-1,4-phenylene)ether resin (Tg: about 214° C.)
Polyphenylene Ether/Polystyrene/Polypropylene Composite Alloy Resin
Production Method The resin (B) (15 parts by weight) and a styrene-ethylene/butylene-styrene block copolymer (styrene content: 53%, specific gravity: 0.97) (10 parts by weight) were added to a miscible resin (100 parts by weight) obtained by kneading the resin (C) and a polystyrene resin at a ratio of 3:1, and they are kneaded using a twin-screw extruder to obtain a polyphenylene ether/polystyrene/polypropylene composite alloy resin (hereinafter, alloy resin (D)).
1-4. Resin (E)
Polypropylene resin (E-1):
Degree of maleic anhydride modification: 0% by weight
Number average molecular weight (Mn): 3,000
Polypropylene resin (E-2):
Degree of maleic anhydride modification: 0% by weight
Number average molecular weight (Mn): 4,000
Polypropylene resin (E-3):
Degree of maleic anhydride modification: 0% by weight
Number average molecular weight (Mn): 9,000
Polypropylene resin (E-4):
Degree of maleic anhydride modification: about 0.3% by weight
Number average molecular weight (Mn): 3,500

Example 1

Manufacturing Composition for Bonded Magnets

The magnetic powder (A), the resin (A), the alloy resin (D), and an antioxidant were introduced into a twin-screw kneading machine such that, with respect to 100 parts by weight of the magnetic powder, the amount of the resin (A) was 7.36 parts by weight, the amount of the resin (D) was 3.15 parts by weight, and the amount of the antioxidant was 0.3 parts by weight. The mixture was kneaded at 220° C. to obtain a kneaded mixture. After cooling, the obtained kneaded mixture was cut into an appropriate size to obtain a composition for bonded magnets.
Molding The obtained composition for bonded magnets was melted in a cylinder at 240° C., and injection-molded in an orientation field of 9 kOe in a mold whose temperature was adjusted to 90° C. Thus, a cylindrical bonded magnet (φ10/t7) was obtained. The magnet was imparted with magnetic properties by pulse magnetization in a magnetizing field of 60 kOe.
Hot Water Resistance Evaluation The magnetized bonded magnet was placed with water in a pressure-resistant vessel and subjected to a pressure cooker test (PCT) (121° C./2 atm/450 hr) to evaluate hot water resistance. For the hot water resistance evaluation, the total flux of the bonded magnet was measured before and after the PCT test using a flux meter, and the hot water resistance was evaluated based on the irreversible demagnetization ratio [(total flux of bonded magnet after 450-hour PCT)/(total flux of bonded magnet before 450-hour PCT)×100)].

Example 2

Manufacturing Composition for Bonded Magnets

The magnetic powder (A), the resin (A), the alloy resin (D), the resin (E-1), and an antioxidant were introduced into a twin-screw kneading machine such that, with respect to 100 parts by weight of the magnetic powder, the amount of the resin (A) was 7.29 parts by weight, the amount of the resin (D) was 3.15 parts by weight, the amount of the resin (E-1) was 0.08 parts by weight, and the amount of the antioxidant was 0.3 parts by weight. The mixture was kneaded at 220° C. to obtain a kneaded mixture. After cooling, the obtained kneaded mixture was cut into an appropriate size to obtain a composition for bonded magnets.

Molding

A bonded magnet was produced in the same manner as in Example 1, and evaluated for hot water resistance.

Comparative Example 1

The magnetic powder (A) and a 12 nylon (PA12) resin (weight average molecular weight Mw: 12,000) were kneaded while heating at 210° C. using a twin-screw kneading machine such that, with respect to 100 parts by weight of the magnetic powder, the amount of the PA12 resin was 8.3 parts by weight and the amount of an antioxidant was 0.3 parts by weight. After cooling, the obtained kneaded mixture was cut into an appropriate size to obtain a composition for bonded magnets.

Molding

The obtained composition for bonded magnets was melted in a cylinder at 230° C., and injection-molded in an orientation field of 9 kOe in a mold whose temperature was adjusted to 90° C. Thus, a cylindrical bonded magnet (φ10/t7) was obtained. The magnet was imparted with magnetic properties by pulse magnetization in a magnetizing field of 60 kOe.

Hot Water Resistance Evaluation

The hot water resistance of the obtained bonded magnet was evaluated in the same manner as in Example 1.

Comparative Example 2

The magnetic powder (A) and a polyphenylene sulfide (PPS) resin (linear; weight average molecular weight Mw: 20,000) were kneaded while heating at 300° C. using a twin-screw kneading machine such that the amount of the PPS resin was 14 parts by weight with respect to 100 parts by weight of the magnetic powder. After cooling, the obtained kneaded mixture was cut into an appropriate size to obtain a composition for bonded magnets.

Molding

The obtained compound was melted in a cylinder at 320° C., and injection-molded in an orientation field of 9 kOe in a mold whose temperature was adjusted to 150° C. Thus, a cylindrical bonded magnet (φ0/t7) was obtained. The magnet was imparted with magnetic properties by pulse magnetization in a magnetizing field of 60 kOe.

Hot Water Resistance Evaluation

The hot water resistance of the obtained bonded magnet was evaluated in the same manner as in Example 1.

Examples 3 to 13 and Comparative Examples 3 and 4

Bonded magnets were produced in the same manner as in Example 1 or Example 2, except that, with respect to 100 parts by weight of the magnetic powder (A), the amounts of the resin (A) and the alloy resin (D) were as indicated in Table 1 and that the type of resin (E) and its amount (with respect to 100 parts by weight of the magnetic powder (A)) were as indicated in Table 1. Then, their hot water resistance was evaluated. In addition, the alloy resin (D) in Example 13 or Comparative Example 4 was provided with a ratio shown in Table 1 by the same method as described above for the alloy resin.

TABLE 1

|  | Resin (A) Parts by weight | Resin (B) Parts by weight | Resin (C) Parts by weight | B + C | Alloy resin (D) Parts by weight | Resin (E) Type | Resin (E) Parts by weight | PA12 resin Parts by weight | PPS resin Parts by weight | Demagnetization ratio % |
|---|---|---|---|---|---|---|---|---|---|---|
| Example 1 | 7.36 | 0.38 | 1.89 | 2.27 | 3.15 | — | — | — | — | 26.3 |
| Example 2 | 7.29 | 0.38 | 1.89 | 2.27 | 3.15 | E-1 | 0.08 | — | — | 26 |
| Example 3 | 7.14 | 0.38 | 1.89 | 2.27 | 3.15 | E-1 | 0.23 | — | — | 20.5 |
| Example 4 | 6.99 | 0.38 | 1.89 | 2.27 | 3.15 | E-1 | 0.38 | — | — | 22 |
| Example 5 | 6.62 | 0.38 | 1.89 | 2.27 | 3.15 | E-1 | 0.75 | — | — | 16.1 |
| Example 6 | 5.87 | 0.38 | 1.89 | 2.27 | 3.15 | E-1 | 1.5 | — | — | 15.4 |
| Example 7 | 5.13 | 0.38 | 1.89 | 2.27 | 3.15 | E-1 | 2.25 | — | — | 16.8 |
| Eaxmple 8 | 6.62 | 0.38 | 1.89 | 2.27 | 3.15 | E-2 | 0.75 | — | — | 17.2 |
| Example 9 | 6.62 | 0.38 | 1.89 | 2.27 | 3.15 | E-3 | 0.75 | — | — | 15 |
| Example 10 | 7.14 | 0.38 | 1.89 | 2.27 | 3.15 | E-4 | 0.23 | — | — | 26.7 |
| Example 11 | 6.99 | 0.38 | 1.89 | 2.27 | 3.15 | E-4 | 0.38 | — | — | 25.3 |
| Example 12 | 6.62 | 0.38 | 1.89 | 2.27 | 3.15 | E-4 | 0.75 | — | — | 26.2 |
| Example 13 | 9.3 | 0.12 | 0.62 | 0.74 | 1.03 | — | — | — | — | 25.2 |
| Comparative Example 1 | — | — | — | — | — | — | — | 8.3 | — | 52 |
| Comparative Examlpe 2 | — | — | — | — | — | — | — | — | 14 | 29.3 |
| Comparative Example 3 | 10.4 | — | — | — | — | — | — | — | — | 38.4 |
| Coparative Example 4 | 5.38 | 0.65 | 3.23 | 3.88 | 5.38 | — | — | — | — | 31.6 |

Example 14

Obtaining First Kneaded Mixture

The magnetic powder (A), the resin (A), and an antioxidant are introduced into a twin-screw kneading machine through its first feeder such that, with respect to 100 parts by weight of the magnetic powder (A), the amount of the resin (A) is 6.62 parts by weight and the amount of the antioxidant is 0.3 parts by weight. The mixture is kneaded at 220° C. to obtain a first kneaded mixture.

Obtaining Second Kneaded Mixture

The alloy resin (D) is introduced into the twin-screw kneading machine through its second feeder such that, with respect to 100 parts by weight of the magnetic powder (A), the amount of the alloy resin (D) is 3.15 parts by weight (with respect to the magnetic powder (A), the amount of the resin (B) is 0.38 parts by weight and the amount of the resin (C) is 1.89 parts by weight), and then kneaded with the first kneaded mixture at 220° C. to obtain a second kneaded mixture.

Obtaining Third Kneaded Mixture

The resin (E-3) is introduced into the twin-screw kneading machine through its third feeder such that the amount of the resin (E-3) is 0.75 parts by weight with respect to 100 parts by weight of the magnetic powder (A), and then kneaded with the second kneaded mixture at 220° C. to obtain a third kneaded mixture. After cooling, the obtained third kneaded mixture is cut into an appropriate size to obtain a composition for bonded magnets.

Molding and Hot Water Resistance Evaluation

A bonded magnet was produced in the same manner as in Example 1 to evaluate hot water resistance.

Table 1 shows the relationships between the composition and the demagnetization ratio of the bonded magnets obtained above. FIG. 1 shows the relationships between the demagnetization ratio and the elapsed time in the PCT test. As shown in FIG. 1, in Comparative Example 1, the demagnetization after one-hour PCT (hereinafter, initial demagnetization) was small, but eventually the magnet was greatly demagnetized. This is probably because, since the moisture-absorbing PA resin was used, the magnetic powder was degraded by reaction with the moisture that penetrated into the magnet over time. In Comparative Example 2, the initial demagnetization was large, the demagnetization proceeded with time, and eventually the magnet was greatly demagnetized. This is probably because the kneading temperature and the bonded magnet molding temperature had to be set to 300° C. due to the high viscosity of the PPS resin, and therefore the magnetic powder was oxidatively degraded at such high temperatures. In Comparative Example 3, the initial demagnetization was small, but eventually the magnet was greatly demagnetized, and thus the same tendency as the 12 nylon magnet was observed. This is probably because, since the acid-modified polypropylene resin alone was used, the heat resistance was insufficient and the magnet was softened at high temperatures, thus allowing penetration and diffusion of moisture into the magnet. The results in Comparative Example 4 are probably because, since the amount of the acid modification polypropylene resin relative to the amount of the alloy resin was small, the water resistance was insufficient, thus allowing penetration and diffusion of moisture into the magnet. In contrast, in Examples 1 to 13, the initial demagnetization and the final demagnetization were both suppressed. This is probably because the kneading temperature and the molding temperature were reduced to 240° C., and also because the resins were incorporated in predetermined amounts to provide the bonded magnet with appropriate hot water resistance. Moreover, Example 14, which had the same composition as in Example 9, would be expected to show a demagnetization ratio equal to or lower than that in Example 9, as described for the first embodiment.

Figure 2:
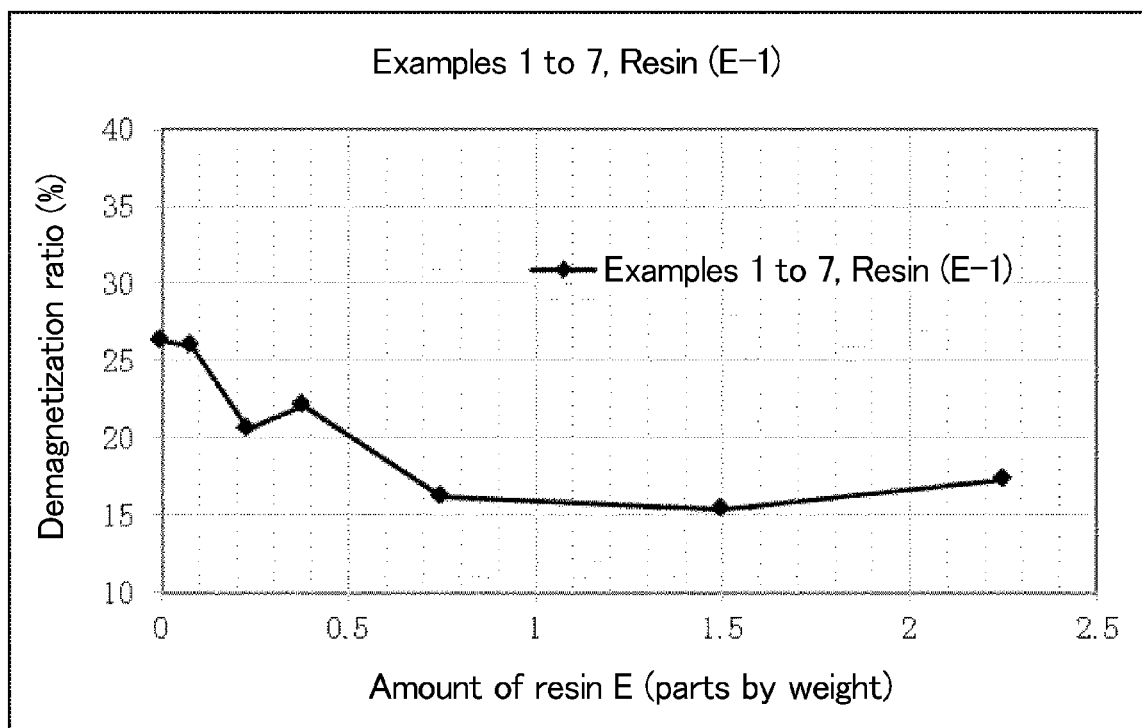
FIG. 2 shows the relationships between the amount of a polypropylene resin having a number average molecular weight of 9,000 or less and the demagnetization ratio after a pressure cooker test (121° C./2 atm/450 hr) according to Examples 1 to 7 of the present disclosure.

FIG. 2 shows a graph of amount of the resin (E-1) versus irreversible magnetization ratio after a pressure cooker test (121° C./2 atm/450 hr). The results show that the amount of the resin (E-1) able to effectively reduce the demagnetization ratio of the magnet was 0.2 parts by weight or greater. The demagnetization ratio was found to be reduced particularly when the amount of the resin (E-1) was 0.75 parts by weight or greater and 1.75 parts by weight or less.

Figure 3:
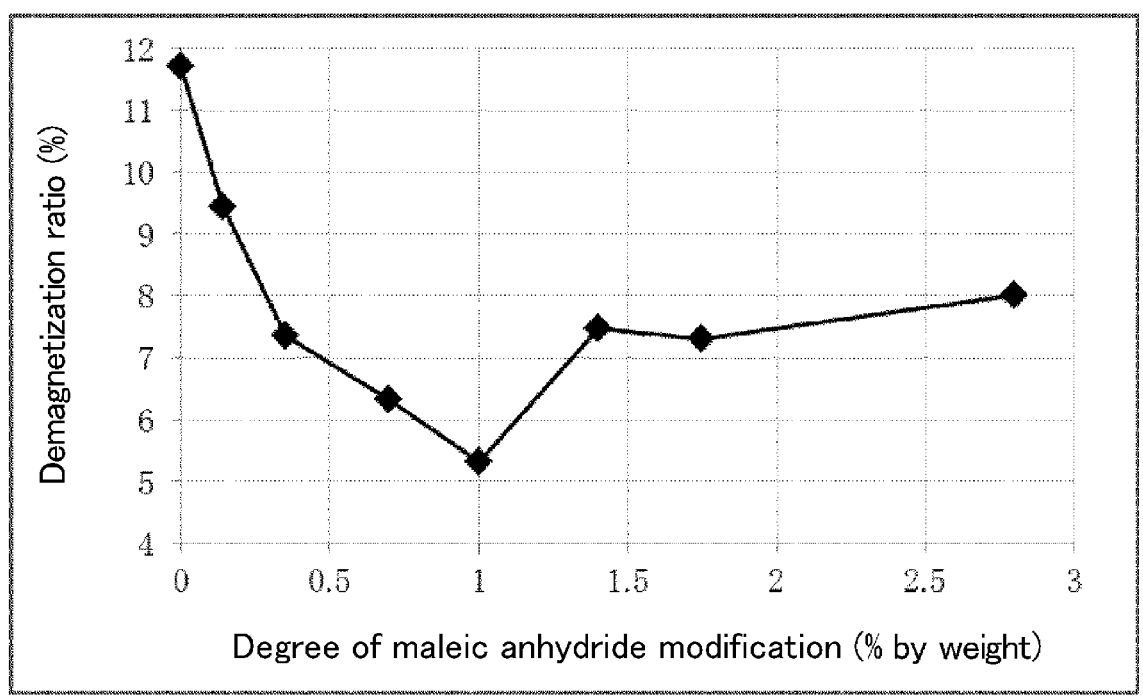
FIG. 3 shows the relationship between the degree of maleic anhydride modification of an acid-modified polypropylene resin and the demagnetization ratio after a pressure cooker test (121° C./2 atm/200 hr) according to Example 1 of the present disclosure.

FIG. 3 shows a graph of degree of maleic anhydride modification versus irreversible demagnetization ratio after a pressure cooker test (121° C/2 atm/200 hr) of bonded magnets produced in the same manner as in Example 1 but replacing the resin (A) with maleic anhydride-modified polypropylene resins having varying degrees of modification ranging from 0 to 2.8% by weight (0, 0.14, 0.35, 0.7, 1, 1.4, 1.75, and 2.8% by weight). The results show that the degree is preferably 0.2% by weight or greater and 2.8% by weight or less, more preferably 0.35% by weight or greater and 1.4% by weight or less, particularly preferably 0.7% by weight or greater and 1.25% by weight or less.

The present invention provides compositions for bonded magnets that may be suitably used in magnet components for motors, sensors, or actuators which are to be exposed to high-temperature, high-humidity environments or hot water.

What is claimed is:

1. A method of manufacturing a composition for bonded magnets, the method comprising:
   obtaining a first kneaded mixture by kneading a rare earth-iron-nitrogen-based magnetic powder and an acid-modified polypropylene resin; and
   obtaining a second kneaded mixture by kneading the first kneaded mixture with a first polypropylene resin and a polyphenylene ether resin,
   wherein, with respect to 100 parts by weight of the rare earth-iron-nitrogen-based magnetic powder, an amount of the acid-modified polypropylene resin is 3.5 parts by weight or greater and less than 10.4 parts by weight, and a total amount of the first polypropylene resin and the polyphenylene ether resin is 0.35 part by weight or greater and less than 3.88 parts by weight.

2. The method of manufacturing a composition for bonded magnets according to claim 1, wherein obtaining the second kneaded mixture comprises kneading the first kneaded mixture with a polymer alloy containing the first polypropylene resin and the polyphenylene ether resin.

3. The method of manufacturing a composition for bonded magnets according to claim 1, wherein the rare earth-iron-nitrogen-based magnetic powder has a coat layer containing a basic group.

4. The method of manufacturing a composition for bonded magnets according to claim 1, wherein the acid-modified polypropylene resin has a degree of acid modification relative to polypropylene of 0.1% by weight or greater and 5% by weight or less.

5. The method of manufacturing a composition for bonded magnets according to claim 1, the method further comprising obtaining a third kneaded mixture by kneading the second kneaded mixture and a second polypropylene resin having a number average molecular weight of 9,000 or less.

6. The method of manufacturing a composition for bonded magnets according to claim 5, wherein the second polypropylene resin having a number average molecular weight of 9,000 or less comprises a non-modified polypropylene resin.

7. The method of manufacturing a composition for bonded magnets according to claim 5, wherein an amount of the second polypropylene resin having a number average molecular weight of 9,000 or less is 0.01 part by weight or greater and 3.5 parts by weight or less with respect to 100 parts by weight of the rare earth-iron-nitrogen-based magnetic powder.

8. A composition for bonded magnets, comprising:
   a rare earth-iron-nitrogen-based magnetic powder;
   an acid-modified polypropylene resin;
   a first polypropylene resin; and
   a polyphenylene ether resin, wherein, with respect to 100 parts by weight of the rare earth-iron-nitrogen-based magnetic powder, an amount of the acid-modified polypropylene resin is 3.5 parts by weight or greater and less than 10.4 parts by weight, and a total amount of the first polypropylene resin and the amorphous resin polyphenylene ether resin is 0.35 part by weight or greater and less than 3.88 parts by weight.

9. The composition for bonded magnets according to claim 8, wherein the acid-modified polypropylene resin is present on a surface of the rare earth-iron-nitrogen-based magnetic powder, and the first polypropylene resin and the polyphenylene ether resin are present on a surface of the acid-modified polypropylene resin.

10. The composition for bonded magnets according to claim 8, wherein the first polypropylene resin and the polyphenylene ether resin form a polymer alloy.

11. The composition for bonded magnets according to claim 8, wherein the rare earth-iron-nitrogen-based magnetic powder has a coat layer containing a basic group.

12. The composition for bonded magnets according to claim 8, wherein the acid-modified polypropylene resin has a degree of acid modification relative to polypropylene of 0.1% by weight or greater and 5% by weight or less.

13. The composition for bonded magnets according to claim 8, further comprising a second polypropylene resin having a number average molecular weight of 9,000 or less.

14. The composition for bonded magnets according to claim 13, wherein the second polypropylene resin having a number average molecular weight of 9,000 or less is present on a surface of the first polypropylene resin and a surface of the polyphenylene ether resin.

15. The composition for bonded magnets according to claim 13, wherein the second polypropylene resin having a number average molecular weight of 9,000 or less comprises a non-modified polypropylene resin.

16. The composition for bonded magnets according to claim 13, wherein an amount of the second polypropylene resin having a number average molecular weight of 9,000 or less is 0.01 part by weight or greater and 3.5 parts by weight or less with respect to 100 parts by weight of the rare earth-iron-nitrogen-based magnetic powder.

17. A method of manufacturing a composition for bonded magnets, the method comprising:
providing a rare earth-iron-nitrogen-based magnetic powder having a coat layer containing a basic group, an acid-modified polypropylene resin, a first polypropylene resin, and an amorphous resin having a glass transition temperature of 120° C. or higher and 250° C. or lower; and
obtaining a kneaded mixture by kneading the rare earth-iron-nitrogen-based magnetic powder having a coat layer containing a basic group, the acid-modified polypropylene resin, the first polypropylene resin, and the amorphous resin having a glass transition temperature of 120° C. or higher and 250° C. or lower,
wherein, with respect to 100 parts by weight of the rare earth-iron-nitrogen-based magnetic powder, an amount of the acid-modified polypropylene resin is 3.5 parts by weight or greater and less than 10.4 parts by weight, and a total amount of the first polypropylene resin and the amorphous resin is 0.35 part by weight or greater and less than 3.88 parts by weight.

18. The method of manufacturing a composition for bonded magnets according to claim 17, wherein the method comprises:
further providing a second polypropylene resin having a number average molecular weight of 9,000 or less; and
obtaining a kneaded mixture by kneading the rare earth-iron-nitrogen-based magnetic powder having a coat layer containing a basic group, the acid-modified polypropylene resin, the first polypropylene resin, the amorphous resin having a glass transition temperature of 120° C. or higher and 250° C. or lower, and the second polypropylene resin having a number average molecular weight of 9,000 or less.

19. A method of manufacturing a composition for bonded magnets, the method comprising:
obtaining a first kneaded mixture by kneading a rare earth-iron-nitrogen-based magnetic powder and an acid-modified polypropylene resin; and
obtaining a second kneaded mixture by kneading the first kneaded mixture with a first polypropylene resin and an amorphous resin having a glass transition temperature of 120° C. or higher and 250° C. or lower,
wherein, with respect to 100 parts by weight of the rare earth-iron-nitrogen-based magnetic powder, an amount of the acid-modified polypropylene resin is 3.5 parts by weight or greater and less than 10.4 parts by weight, and a total amount of the first polypropylene resin and the amorphous resin is 0.35 part by weight or greater and less than 3.88 parts by weight, and wherein the rare earth-iron-nitrogen-based magnetic powder has a coat layer containing a basic group.

20. A composition for bonded magnets, comprising:
a rare earth-iron-nitrogen-based magnetic powder;
an acid-modified polypropylene resin;
a first polypropylene resin; and
an amorphous resin having a glass transition temperature of 120° C. or higher and 250° C. or lower,
wherein, with respect to 100 parts by weight of the rare earth-iron-nitrogen-based magnetic powder, an amount of the acid-modified polypropylene resin is 3.5 parts by weight or greater and less than 10.4 parts by weight, and a total amount of the first polypropylene resin and the amorphous resin is 0.35 part by weight or greater and less than 3.88 parts by weight, and wherein the rare earth-iron-nitrogen-based magnetic powder has a coat layer containing a basic group.

* * * * *